United States Patent
Williams et al.

(10) Patent No.: US 7,388,039 B2
(45) Date of Patent: *Jun. 17, 2008

(54) UV-CURABLE, NON-CHLORINATED ADHESION PROMOTERS

(75) Inventors: Kevin Alan Williams, Mount Carmel, TN (US); Michael Bellas, Lancs (GB); Charlie Carroll Freeman, Jr., Rogersville, TN (US); Lisa Kay Templeton, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/890,861

(22) Filed: Jul. 14, 2004

(65) Prior Publication Data

US 2004/0249014 A1 Dec. 9, 2004

Related U.S. Application Data

(63) Continuation of application No. 10/068,627, filed on Feb. 6, 2002, now Pat. No. 6,831,115, which is a continuation-in-part of application No. 09/943,559, filed on Aug. 30, 2001, now abandoned.

(60) Provisional application No. 60/267,829, filed on Feb. 9, 2001.

(51) Int. Cl.
*C08F 2/50* (2006.01)
*C08F 255/04* (2006.01)
*C08J 3/24* (2006.01)
*C08J 3/03* (2006.01)
*B32B 27/32* (2006.01)

(52) U.S. Cl. .......................... 522/189; 522/31; 522/60; 522/84; 522/86; 522/85; 522/113; 522/114; 522/119; 522/120; 522/121; 522/150; 522/157; 522/158; 522/161; 522/184; 522/186; 522/185; 524/500; 524/502; 524/504; 524/529; 524/533; 524/534; 427/508; 427/516; 427/517; 428/411.1; 428/500

(58) Field of Classification Search ................ 524/500, 524/502, 504, 529, 533, 534, 503; 522/31, 522/60, 84, 85, 86, 113, 114, 119, 120, 121, 522/150, 157, 158, 161, 184, 185, 168, 189; 427/508, 516, 517; 428/411.1, 500
See application file for complete search history.

(56) References Cited

U.S. PATENT DOCUMENTS

| | | | |
|---|---|---|---|
| 3,579,485 A | 5/1971 | Fotzenlogen et al. | |
| 4,070,421 A | 1/1978 | Etter, Jr. | |
| 4,146,590 A | 3/1979 | Yamamoto et al. | |
| 4,229,754 A * | 10/1980 | French | 257/225 |
| 4,286,047 A | 8/1981 | Bennett et al. | |
| 4,299,754 A | 11/1981 | Shiomi et al. | |
| 4,303,697 A | 12/1981 | Baseden | |
| 4,461,809 A | 7/1984 | Shiomi et al. | |
| 4,632,962 A | 12/1986 | Gallucci | |
| 4,727,120 A | 2/1988 | Nogues | |
| 4,880,849 A | 11/1989 | Poole et al. | |
| 4,966,947 A | 10/1990 | Fry et al. | |
| 4,968,559 A | 11/1990 | Kuroda et al. | |
| 4,997,882 A | 3/1991 | Martz et al. | |
| 5,030,681 A | 7/1991 | Asato et al. | |
| 5,109,097 A | 4/1992 | Klun et al. | |
| 5,118,567 A | 6/1992 | Komiyama | |
| 5,135,984 A | 8/1992 | Kinosada et al. | |
| 5,143,976 A | 9/1992 | Ashihara et al. | |
| 5,227,198 A | 7/1993 | Laura et al. | |
| 5,262,075 A | 11/1993 | Chung et al. | |
| 5,300,363 A | 4/1994 | Laura et al. | |
| 5,373,048 A | 12/1994 | Witzeman et al. | |
| 5,412,029 A * | 5/1995 | Elm et al. | 525/71 |
| 5,427,856 A | 6/1995 | Laura et al. | |
| 5,523,358 A | 6/1996 | Hirose et al. | |
| 5,587,418 A | 12/1996 | Sasaki et al. | |
| 5,620,747 A | 4/1997 | Laura et al. | |
| 5,626,915 A | 5/1997 | Laura et al. | |
| 5,629,046 A | 5/1997 | Laura et al. | |
| 5,663,266 A | 9/1997 | Taylor et al. | |
| 5,693,423 A | 12/1997 | Laura et al. | |
| 5,709,946 A | 1/1998 | Jackson et al. | |
| 5,728,767 A * | 3/1998 | Kanetou et al. | 524/504 |

(Continued)

FOREIGN PATENT DOCUMENTS

EP    0 355 895 A2    2/1990

(Continued)

OTHER PUBLICATIONS

Principles of Polymerization. George Odian. Copyright 1970, p. 97.*

(Continued)

*Primary Examiner*—Sanza L. McClendon
(74) *Attorney, Agent, or Firm*—Polly C. Owen; Bernard J. Graves, Jr.

(57) ABSTRACT

Modified polyolefins are produced by reacting a functionalized polyolefin with one or more ethylenically unsaturated compounds having a functional group reactive with the functional group on the polyolefin. These modified polyolefins may then polymerize in the presence of a photoinitiator upon exposure to ultraviolet radiation and also have the capability of copolymerizing in the presence of a photoinitiator with other ethylenically unsaturated crosslinking agents upon exposure to ultraviolet radiation. These modified polyolefins may also contain pendant carboxyl groups, which have the propensity to form hydrophilic salts with amines, and therefore may be rendered water-dispersible. The modified polyolefins of the present invention significantly improve the adhesion of paints, inks, and adhesives to various plastic and metal substrates.

41 Claims, No Drawings

U.S. PATENT DOCUMENTS

| | | |
|---|---|---|
| 5,756,566 A | 5/1998 | Laura |
| 5,759,703 A | 6/1998 | Neymark et al. |
| 5,801,219 A | 9/1998 | Neymark et al. |
| 5,804,640 A | 9/1998 | Laura et al. |
| 5,811,489 A | 9/1998 | Shirai et al. |
| 5,863,646 A | 1/1999 | Verardi et al. |
| 5,880,190 A | 3/1999 | Laura |
| 6,001,469 A | 12/1999 | Verardi et al. |
| 6,184,264 B1 | 2/2001 | Webster |
| 6,262,182 B1 | 7/2001 | Eagan et al. |
| 6,310,134 B1 | 10/2001 | Templeton et al. |
| 2002/0156144 A1 | 10/2002 | Williams et al. |

FOREIGN PATENT DOCUMENTS

| | | | |
|---|---|---|---|
| EP | 0 369 674 A1 | | 5/1990 |
| EP | 0 406 855 A2 | | 1/1991 |
| EP | 0 489 495 A2 | | 6/1992 |
| EP | 0 767 186 B1 | | 4/1997 |
| EP | 0767186 B1 | * | 4/1997 |
| EP | 1 036 817 A1 | | 9/2000 |
| WO | WO 97/06836 | | 2/1997 |

OTHER PUBLICATIONS

Principles of Polymerization, George Odian, 1970, p. 97.
U.S. Appl. No. 10/208,642, filed Jul. 30, 2002, Williams et al.
Office Action dated Oct. 9, 2007, in related U.S. Appl. No. 10/610,238, filed Jun. 30, 2003.
U.S. Appl. No. 09/943,561, filed Aug. 30, 2001, Williams et al.
U.S. Appl. No. 10/068,627, filed Jul. 30, 2002, Williams et al.
Office Action dated Sep. 22, 2004, from the European Patent Office for Application No. 02756848.4.
Office Action dated Feb. 13, 2006, in related U.S. Appl. No. 10/610,238, filed Jun. 30, 2003.
Office Communication (Interview Summary) dated Jul. 28, 2006, in related U.S. Appl. No. 10/610,238, filed Jun. 30, 2003.
Office Action dated Nov. 15, 2006, in related U.S. Appl. No. 10/610,238, filed Jun. 30, 2003.
Notification of Transmittal of the International Search Report or the Declaration for Corresponding PCT / US02 / 03775.
Notification of Transmittal of the International Search Report or the Declaration for Related PCT / US02 / 03518.

* cited by examiner

UV-CURABLE, NON-CHLORINATED ADHESION PROMOTERS

CROSS-REFERENCE TO RELATED APPLICATIONS

This application is a continuation of and claims benefit to the prior filed application having U.S. Ser. No. 10/068,627 filed Feb. 6, 2002, now U.S. Pat. No. 6,831,115, which was a continuation-in-part of U.S. application Ser. No. 09/943,559, filed on Aug. 30, 2001 now abandoned, incorporated herein by reference, which claims the benefit, under 35 USC 119, of U.S. Provisional Application Ser. No. 60/267,829, filed Feb. 9, 2001.

FIELD OF THE INVENTION

This invention relates to the field of coating compositions. In particular, it relates to modified polyolefins useful as primers

BACKGROUND OF THE INVENTION

Molded plastic parts are widely used in automobiles, trucks, household appliances, graphic arts and the like. Frequently these plastic parts are made from polyolefins such as polyethylene, ethylene copolymers, polypropylene, propylene copolymers and polyolefin blends with other polymers. One such blend is a thermoplastic polyolefin (TPO), which is a rubber-modified polypropylene. Frequently, these plastic parts have to be painted to match the color of painted metal parts that are also present in the automobile, appliance or other items. Typical paints do not adhere well to these plastic parts. Thus, adhesion-promoting primers are needed to improve the adhesion of the paints to the polyolefin materials.

Chlorinated polyolefins, particularly chlorinated, maleated crystalline polypropylene polymers are effective as adhesion-promoting primers and they have very limited solubility in anything other than aromatic or chlorinated solvents. The U.S. Federal Clean Air Act of 1990 limits the amounts of solvents that are on the Hazardous Air Pollutants (HAPs) list that can be used in some areas, and most practical aromatic and chlorinated solvents for use in coatings applications are on the HAPs list. There are some applications where a non-chlorinated adhesion promoter is desired. Other systems proposed for use as primers are based on maleated amorphous polyolefins, which are dissolved in aromatic solvents such as xylene and toluene.

Attempts have been made to provide water based paints and primers for the automotive and appliance industries but these systems generally are not thought to be as effective as solvent based systems. For example, the polymers used in water based systems must be emulsified or dispersed in water using a nonionic, cationic or anionic surfactant and a primary, secondary or tertiary amine, which can lend water-sensitivity to the applied coating.

U.S. Pat. No. 4,286,047 describes pressure-sensitive adhesives that are readily detackifiable by exposure to ultraviolet radiation. These adhesive systems contain a normally tacky and pressure-sensitive adhesive having an epoxy equivalent value of about 400-900 and including an effective amount of an ionic photoinitiator. These adhesives show a decrease in adhesion to surfaces such as glass, aluminum, circuit boards, silicon wafers, and enamel after exposure to ultraviolet radiation.

U.S. Pat. No. 4,303,697 discloses a process for improving the adhesion of paint to polyolefin surfaces. In this process polyolefin surfaces, such as polyethylene, polypropylene, ethylene/propylene copolymers, and EPDM copolymers (TPOs), are primed with a chlorinated polyolefin, which comprises chlorinated polypropylene and chlorinated polypropylene containing carboxylic anhydride groups, and then exposed to ultraviolet radiation. This treatment improves both the dry and wet adhesion of paint to the polyolefin surfaces.

U.S. Pat. No. 4,880,849 describes a coating composition which crosslinks upon exposure to ultraviolet radiation. This composition consists of (a) from 1 to 5 percent of a saturated, chlorinated polymeric material selected from the group consisting of (1) a chlorinated polyolefin containing about 5 to 75 percent by weight of chlorine and having a number average molecular weight of about 5,000 to 50,000, (2) a chlorinated polyolefin containing carboxylic anhydride groups and about 5 to 25 percent by weight of chlorine and having a number average molecular weight of about 5,000 to 50,000, and (3) a mixture thereof; (b) from 20 to 80 percent of a radiation sensitive monomer having at least two addition polymerizable unsaturated bonds; (c) from 0.1 to 5.0 percent of a photopolymerization initiator; and (d) from 80 to 20 percent of an acrylic addition polymer having at least one amino group and having a number average molecular weight of about 8,000 to 70,000. This patent discloses a method of coating comprising (1) applying a film of the coating composition of the invention to a plastic substrate, and (2) curing the film by exposing the film to ultraviolet radiation.

U.S. Pat. No. 4,968,559 describes an adhesive film comprising (a) a base film permeable to ultraviolet light, (b) a layer of a pressure sensitive adhesive formed on one side of the film.

U.S. Pat. No. 5,118,567 describes an adhesive tape comprising an energy beam transmittable base sheet and an adhesive layer formed on the surface of the said base sheet.

U.S. Pat. No. 5,373,048 discloses a composition for a water based adhesion promoter that consists of a non-chlorinated polyolefin, a nonionic surfactant, a primary, secondary or tertiary amine, and water.

U.S. Pat. No. 5,728,767 describes an aqueous resin composition comprising (a) 80 to 10 parts by weight of a modified polyolefin; and (b) 20 to 90 parts by weight of an acrylic or methacrylic monomer or mixture thereof.

U.S. Pat. No. 6,184,264 describes "switchable" adhesive compositions, which are capable of being transformed from a tacky to a non-tacky state. These compositions comprise an adhesive polymeric moiety and a plurality of bound in visible light curable groups, which are chemically bound to the adhesive polymeric moiety. The curing reaction of these adhesive compositions is initiated by visible light. This technology is also disclosed in WO 97/06836.

U.S. Pat. No. 6,262,182 describes a solution process for the modification of certain polyolefins with an unsaturated anhydride, unsaturated acid or unsaturated ester.

SUMMARY OF THE INVENTION

This invention relates to modified polyolefins containing unsaturated pendant groups prepared by reacting a functionalized polyolefin with one or more ethylenically unsaturated compounds having a functional group reactive with the functional group on the polyolefin. These modified polyolefins polymerize in the presence of a photoinitiator upon exposure to ultraviolet radiation and also are capable of copolymerizing in the presence of a photoinitiator with other ethylenically unsaturated crosslinking agents upon exposure to ultraviolet radiation. Alternatively, the modified polyolefins will polymerize in the absence of a photoinitiator when electron beam radiation is utilized. The modified polyolefins are prepared from polyolefins having a heat of fusion ($\Delta H_f$) of 0 to 10 calories/gram, preferably 0 to 8 calories/gram. The modified polyolefins of the present invention significantly improve the adhesion of paints, inks, and adhesives to various plastic and metal substrates. In addition, the modified polyolefins may also contain pendant carboxyl groups, which have the propensity to form hydrophilic salts with amines, therefore rendering the modified polyolefins water-dispersible.

The solvent-based and water-based primer compositions disclosed in this invention are excellent adhesion promoters for polyolefin and other types of plastic substrates. These compositions also provide good solvent and water resistance when top coated with a variety of paint topcoats and are environmentally advantageous.

DETAILED DESCRIPTION OF THE INVENTION

In a first embodiment, the present invention provides a modified polyolefin composition having pendant unsaturated groups and at least one other pendant functional group comprising the reaction product of a functionalized polyolefin and one or more ethylenically unsaturated compounds having a functional group reactive with the functional group on the polyolefin, wherein the functionalized polyolefin is prepared from a polyolefin having a heat of fusion ($\Delta H_f$) of 0 to 10 calories/gram, preferably 0 to 8 calories/gram. These compositions have been found to be useful as adhesion promoters for coating compositions, inks and adhesives.

The polyolefins useful as starting materials in the present invention are preferably amorphous, but may exhibit some measurable crystallinity. In this regard, the starting material polyolefins will exhibit a heat of fusion ($\Delta H_f$) of 0 to 10 calories/gram, preferably 0 to 8 calories/gram, as indicated by differential scanning calorimetry (DSC). The methodology for determination of heat of fusion is described below. Exemplary starting material polyolefin polymers for practice of the invention include ethylene copolymers prepared from alpha olefins having 3 to about 10 carbon atoms, polypropylene, propylene copolymers containing ethylene or alpha olefins having from 4 to about 10 carbon atoms, poly(1-butene), 1-butene copolymers prepared from ethylene or alpha olefins having 3 to about 10 carbon atoms and the like. In addition, mixtures of the previously mentioned polyolefins may be used in this process as opposed to using a single polyolefin. Preferred copolymers include propylene-ethylene copolymers comprising 70-90 mole percent propylene and about 10-30 mole percent ethylene having a heat of fusion of 0 to 8 calories/gram.

Monomers useful in the initial step of functionalizing the polyolefin include unsaturated carboxylic acid esters, unsaturated carboxylic acids, unsaturated carboxylic acid anhydrides, and vinyl or acrylic monomers such as hydroxyalkyl acrylates, hydroxyalkyl methacrylates or mixtures thereof and the like. Preferred monomers include, but are not limited to, maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate, hydroxyethyl acrylate, hydroxyethyl methacrylate, hydroxypropyl acrylate, hydroxypropyl methacrylate, polyethylenglycol monoacrylate, polyethyleneglycol monomethacrylate, polyalkyleneglycol monomethacrylate, polypropyleneglycol monoacrylate, polypropyleneglycol monomethacrylate, and the like.

Preferably, the concentration of the unsaturated carboxylic acid anhydride, unsaturated carboxylic acid, unsaturated carboxylic acid ester, vinyl monomer or acrylic monomer is in the range of about 1 to about 30 weight percent based on the weight of the polyolefin. A more preferred range is from about 2 to about 15 weight percent. A range of about 4 to about 12 weight percent is most preferred.

These monomers are readily grafted to polyolefins either in the melt phase or in solution using radical initiators, such as organic peroxides or azo compounds, as the catalyst. A preferred method includes the grafting of the monomers in a solution process according to the procedure described in U.S. Pat. No. 6,262,182, incorporated herein by reference.

The reaction temperature is usually controlled by the half-life of the peroxide initiator. The half-life of the initiator at a given reaction temperature should be about one third to about one sixth of the reaction time. By knowing the half-life of the initiator at a specific temperature, a suitable reaction time can be quickly determined. The more stable the initiator, the longer the reaction time will be. For example, a peroxide may be suitable if its half-life at a given reaction temperature is 10 hours or less.

Examples of organic peroxides, which may be used, include, but are not limited to, dibenzoyl peroxide, tert-amylperoxy 2-ethylhexanoate, tert-butylperoxy 2-ethylhexanoate, tert-butylperoxy isobutyrate, and tert-butyl peroxy isopropyl carbonate, tert-butyl peroxy 3,5,5-trimethylhexanoate, 2,5-dimethyl-2,5-di(benzoylperoxy)hexane, tert-butylperoxy acetate, tert-butylperoxy benzoate, n-butyl 4,4-di(tert-butyl)valerate, dicumyl peroxide, tert-butylcumyl peroxide, di(2-tert.butylperoxy isopropyl)benzene, 2,5-dimethyl-2,5-di(tert-butylperoxy)hexane, di(tert-butyl) peroxide, 2,5-dimethyl-2,5-di(tert-butylperoxy)-3-hexyne, tert-butyl hydro peroxide, cumyl hydroperoxide and mixtures thereof.

Examples of suitable azo compounds include, but are not limited to, 2,2'-azobisisopropionitrile, 2,2'-azobisisobutyronitrile (AIBN), dimethyl azoisobutyrate, 1,1'azobis(cyclohexanecarbonitrile), 2,2'-azobis(2-methylpropane) and mixtures thereof.

Typical concentrations of radical initiators range from about 0.1 to about 20-weight %, based on the weight of the polyolefin. A more preferable range is from about 0.2 to about 10-weight %.

The addition of the monomers and a radical initiator can be carried out under numerous scenarios. For example, these monomers can be added before the radical initiator, concurrent with the radical initiator or subsequent to the radical initiator. The monomer can be added in either the molten state or as a solution in a solvent that does not interfere with the grafting reaction. Likewise, the radical initiator can be added in either solid or liquid form. It is also possible to charge a solution of the grafting monomer containing the initiator in a solvent that does not interfere with the desired reaction. The solvent used for this purpose can be the same or different from the reaction solvent. Preferably the solvent has a low volatility such that it flashes off and does not dilute or contaminate the reaction solvent. Preferred solvents for dissolving the grafting monomer include ketone solvents such as acetone and methyl ethyl ketone. In general, the ketone solvents are used in amounts that do not cause the polyolefin to precipitate.

The grafting process is typically conducted in solution at temperatures ranging from about 50° C. to about 300° C., depending on the choice of solvent. The reaction may be carried out at temperatures up to and including the boiling point of the solvent. A more preferred temperature range is from about 70° C. to about 240° C.; and a most preferred range is from about 80° C. to about 220° C.

Following the completion of the grafting reaction, the solvent used in the grafting reaction may be removed by distillation at either ambient pressure or more preferably at reduced pressure. As a way of reducing cost in the process, the solvent may be recovered and recycled in subsequent batches. Solvents with relatively low boiling points are typically easier to remove and consequently more desirable for use in this process. Preferred solvents include tert-butylbenzene (b.p. 169° C.) and anisole (b.p. 154° C.) because of their lack of reactivity and ease of removal.

In the process of the present invention, the functionalized (grafted) polyolefin is further reacted (fully or partially) with one or more ethylenically unsaturated compounds having a functional group reactive with the functional group on the polyolefin. Useful ethylenically unsaturated compounds include, but are not limited to, hydroxyalkyl acrylates, hydroxyalkyl methacrylates, unsaturated carboxylic anhydrides, unsaturated carboxylic acid esters, unsaturated carboxylic acids, or mixtures thereof and the like. Useful hydroxyalkyl acrylates or methacrylates include, but are not limited to, hydroxyethyl acrylate, hydroxyethyl methacrylate, hydroxypropyl acrylate, hydroxypropyl methacrylate, polyethylenglycol monoacrylate, polyethyleneglycol monomethacrylate, polyalkyleneglycol monomethacrylate, polypropylene-glycol monoacrylate, polypropyleneglycol monomethacrylate and the like. Useful unsaturated carboxylic anhydrides, unsaturated carboxylic acid esters, and unsaturated carboxylic acids include, but are not limited to, maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate and the like.

The reaction of the ethylenically unsaturated compounds, having a functional group reactive with the functional group on the polyolefin, with the functionalized (grafted) polyolefin may be carried out in the presence or absence of a solvent. However, it is preferred to conduct the reaction in a solvent at temperatures in the range of 40° C. to 250° C. Any solvent in which the functionalized polyolefin is soluble or partially soluble may be used. Suitable solvents include aromatic hydrocarbon solvents such as benzene, toluene, xylene, tert-butylbenzene, chlorinated solvents, aliphatic hydrocarbon solvents such as naphtha, mineral spirits, and hexane, ester solvents such as propyl acetate and butyl acetate as well as ketones such as methyl amyl ketone. Mixtures of solvents may be used if desired. It may or may not be desirable to conduct this reaction in the reaction solvent from the initial grafting reaction. It also may be desirable to conduct this reaction in the solvent to be used for dissolving the final resin. The ethylenically unsaturated compound having a functional group will generally be used in the range of about 0.01 to about 25-weight % based on the weight of the functionalized polyolefin.

In some instances a catalyst may be used to promote the reaction of the functionalized polyolefin with the functionalized, ethylenically unsaturated compound. There are a variety of acid and base catalysts that may be employed, such as sulphuric acid, p-toluenesulfonic acid, perchloric acid, zinc chloride, sodium acetate, sodium hydroxide, tertiary aliphatic amines, pyridine, and the like. Other types of catalysts that may be employed are ion exchange resins, which are usually sulfonic acid cation exchangers in the hydrogen form, metallic catalysts such as aluminum oxide, lead, tin, and zinc hydroxides as well as tetraalkyl titanates and zirconates such as titanium tetraisopropoxide, titanium tetraisobutoxide and the like.

The functionalized polyolefin may be fully or partially reacted with the functionalized, ethylenically unsaturated compound to yield a modified polyolefin composition having pendant unsaturated groups and in most cases at least one other pendant functional group. For example, it may be desirable to only partially react the functionalized polyolefin with the functionalized, ethylenically unsaturated compound to provide for a balance of properties and functional groups. Depending on how the functionalized polyolefin is prepared and the corresponding modification with the ethylenically unsaturated compound, a variety of pendant functional groups are possible. In some instances it is possible to have two or more pendant functional groups on the polyolefin, with at least one of those groups being a pendant unsaturated group. For example, it is possible to have pendant unsaturated groups, carboxyl, and hydroxyl functionality present on the modified polyolefin. In other instances, one may desire to fully react the functionalized polyolefin with the functionalized, ethylenically unsaturated compound to yield a polyolefin containing mostly pendant unsaturated groups. In this instance, a catalyst may or may not be required to complete the reaction.

These modified polyolefin resins are readily soluble in typical coating solvents such as toluene, xylene, naphtha, mineral spirits, hexane, and ester solvents such as propyl acetate and butyl acetate as well as ketones such as methyl amyl ketone. Mixtures of solvents may be used if desired.

The modified polyolefins of the present invention may also contain pendant carboxyl groups, which have the propensity to form hydrophilic salts with amines and therefore may allow the modified polyolefins to be rendered water-dispersible. The modified polyolefin may contain a combination of both pendant unsaturated groups and pendant carboxylic acid groups. For example, this can be accomplished by reacting an anhydride functional polyolefin (functionalized polyolefin) with one mole of a hydroxyl-functional, ethylenically unsaturated compound to yield a modified polyolefin containing both acrylate and carboxyl functionality. Further by way of example, a polyolefin may be reacted with maleic anhydride to provide a carboxyl functional polyolefin, i.e., a maleated polyolefin; this maleated polyolefin may then be further reacted with, for example, hydroxyethyl acrylate to provide a polyolefin having both pendant carboxy and pendant unsaturation. Alternatively, in such a case, the maleated polyolefin may be reacted with an excess of hydroxyethyl acrylate to provide a modified polyolefin having only pendant unsaturation, i.e., with all of the free carboxyl groups esterified. Thus, in a further aspect of the invention, there is provided a modified polyolefin composition having pendant unsaturated groups comprising the reaction product of a functionalized polyolefin and one or more ethylenically unsaturated compounds having a functional group reactive with the functional group on the polyolefin.

The modified polyolefins, which possess carboxyl functional groups may also be rendered water-dispersible. These modified polyolefins, having both pendant unsaturation and carboxyl groups, may be dispersed by emulsifying the modified polyolefin having pendant unsaturation in the presence of at least one amine and water; depending on molecular weight and acid number, it may be desirable or even necessary to utilize at least one surfactant, at least one amine, and water. This method for dispersing carboxylated resins is described in U.S. Pat. No. 5,373,048, incorporated herein by reference. The total amount of modified polyolefin in this composition is not significant as long as the relative amounts of surfactant and amine are within typically used ranges for similar materials.

One class of surfactants useful in this invention may be broadly described as nonionic surfactants. The surfactants may have a molecular weight of up to 500 or greater and may include polymeric materials. The surfactants include materials which contain groups of varying polarity whereby one part of the molecule is hydrophilic and the other part of the molecule is hydrophobic. Examples of such materials include polyethyleneoxy polyols and ethoxylated alkyl phenols. Particularly preferred classes of surfactants include alkyl phenoxy poly(ethyleneoxy) alcohols, primary ethoxylated alcohols and secondary ethoxylated alcohols. Preferably the surfactant is a primary ethoxylated alcohol having 12 to 15 carbon atoms or a secondary ethoxylated alcohol having 11 to 15 carbon atoms. Examples of alkyl phenoxy poly(ethyleneoxy) alcohols include IGEPAL® CO-710 sold by Rhone Poulenc. Examples of primary ethoxylated alcohols include NEODOL® 25-9 and NEODOL® 25-12 sold by Shell Chemical Company. Examples of secondary ethoxylated alcohols include TERGITOL® 15-S-9 and TERGITOL® 15-S-15 sold by Union Carbide Company. The amount of surfactant is broadly in the range of 18 to 50 weight percent and is preferably in the range of 20 to 25 weight percent, based on the weight of the modified carboxylated polyolefin. Other examples of surfactants include those described in U.S. Pat. No. 5,663,266, incorporated herein by reference.

The amine component may be a primary, secondary, or tertiary amine. The amine may be aromatic or aliphatic, but aliphatic amines are preferred. The amount of amine may be in the range of 4 to 30 weight percent and preferably is in the range of 8 to 10 weight percent, based on the weight of the modified polyolefin. Typical amines include ammonia, trimethylamine, diethylamine, monoethanolamine, monoisopropanolamine, morpholine, ethanolamine, diethanolamine, triethanolamine, N,N-dimethyl-ethanolamine, N,N-diethylethanolamine, N-methyl-diethanolamine and the like.

The amount of water may vary widely and there is no upper limit on the amount of water used. There may be a lower limit on the amount of water because there should be sufficient water in the composition to result in the formation of an admixture of the four components. Generally, there should be at least 50 weight percent water in the composition, based on the weight of the total composition.

The modified polyolefins having pendant unsaturation may be readily used as primers for substrates which typically suffer from poor coating adhesion to conventional coating compositions, for example, plastic and metal substrates. Thus, in a further aspect, the present invention provides a solvent based primer composition comprising the modified polyolefin of claim 1, a solvent, and optionally, a photoinitiator.

The modified polyolefins having pendant unsaturation may be applied to the substrate as prepared or they may be further diluted with any of the solvents listed previously. The water-dispersible versions may also be applied to the substrate as prepared or they may be further diluted with water. Thus, in a further aspect of the invention, there is provided a water-based primer composition comprising:
 a. the modified polyolefin composition of the invention;
 b. from 18 to 50 weight percent, based on the weight of component (a), of a surfactant;
 c. from 2 to 30 weight percent, based on the weight of component (a), of an amine;
 d. water; and optionally,
 e. a photoinitiator.

Both the solvent and water-based materials may be applied to the substrate by spray application, dipping, or any other means available, which allows for a uniform coating of the modified polyolefin onto the substrate. Subsequent topcoats, such as paints, adhesives, and inks, can then be applied on top of the primers of the present invention.

These modified polyolefins having pendant unsaturation may also be readily used as additives for commercially available radiation curable top coats or thermally cured topcoats. In this instance, the modified polyolefin adhesion promoter may be added to the coating composition prior to application on a substrate.

The coating compositions of the present invention may optionally contain a photoinitiator. Before application of the modified polyolefin to the substrate, a photoinitiator may be added to the modified polyolefin or modified polyolefin solution or dispersion. The amount of photoinitiator added is typically in the range of 0.01 to 8.0 weight percent based on the non-volatile, ethylenically unsaturated content of the coating composition; preferably about 0.05 to 5.0 weight percent of the non-volatile, ethylenically unsaturated content of the coating composition. The photoinitiator can be any photoinitiator known to one skilled in the art. Suitable photoinitiators include, but are not limited to acetophenone and benzophenone/tertiary amine combinations, dialkoxyacetophenone derivatives, organic peroxides, benzoin and its ethers, and benzil and benzil ketals. A typical photoinitiator is 1-hydroxy-cyclohexyl-phenyl-ketone or IRGACURE® 184, available from Ciba Specialty Chemicals, Inc. If a UV curable composition is desired, a photoinitiator must be present. In the case of electron beam curing, the photoinitiator may be omitted. Further details regarding such photoinitiators and curing procedures can be found in U.S. Pat. No. 5,109,097, incorporated herein by reference.

The modified polyolefin or modified polyolefin solution or dispersion may also contain auxiliary polymerizable monomers and/or oligomers such as, but not limited to, vinyl acetate, N-vinyl pyrrolidone methyl (meth)acrylate, butyl (meth)acrylate, 2-hydroxyethyl (meth)acrylate, neopentylglycol di(meth)acrylate, triethyleneglycol di(meth)acrylate, trimethylolpropane triacrylate, (meth)acrylated urethanes such as Ebecryl® 220, SARTOMER® CN 964 and CN 965, (meth)acrylated epoxies such as SARTOMER® CN 104, and (meth)acrylated polyesters and polyethers.

After application of the modified polyolefin to the substrate, the modified polyolefin may be cured (i.e. polymerized and crosslinked) in the liquid or solid state (i.e. as a dry film) using methods known in the art. The modified polyolefin may be cured in the presence of a photoinitiator by an amount of ultraviolet radiation sufficient to effect the desired degree of curing. Depending upon thickness of the coating film, product formulation, photoinitiator type, radiation flux, and source of radiation, exposure times to ultraviolet radiation for about 0.5 seconds to about 30 minutes are typically used for curing the coating composition. Curing may also occur by exposure to sunlight.

After application of the modified polyolefin to the substrate, it may then be topcoated, i.e., a conventional thermal or UV curable topcoating composition may be applied. The topcoat may be applied before or after the modified polyolefin has been cured. If the topcoat is applied after the modified polyolefin has been cured, then the topcoat may or may not have to go through a thermal or radiation curing process. If the topcoat is applied before the modified polyolefin has been cured, then the topcoat and modified polyolefin may go through a radiation curing process together.

The modified polyolefins which have pendant unsaturated groups are soluble in typical coating solvents such as toluene, xylene, naphtha, mineral spirits, hexane, and ester solvents such as propyl acetate and butyl acetate as well as ketones such as methyl amyl ketone. Mixtures of solvents may be used if desired. As noted above, these polyolefins are especially useful as primers for coating substrates which suffer from poor adhesion to ordinary coating compositions. Accordingly, such resins may be applied to, for example, a plastic substrate, allowed to dry, and a conventional topcoat coating composition applied thereto. Alternatively, the polyolefins of the invention may be blended with various conventional coating compositions to afford a self-priming composition useful for coating such coating substrates. In this regard, such topcoat compositions may be any conventional coating composition, typically comprised of any number of traditional resins, for example, polyesters, acrylics, urethanes, melamines, alkyds, etc. In addition, such compositions may also further comprise one or more typical coatings additives. Thus, as a further aspect of the present invention there is provided a coating composition comprising the polyolefins of the present invention as described herein, further comprising one or more coatings additives such as leveling, rheology, and flow control agents such as silicones, fluorocarbons or cellulosics; neutralized carboxylic acid-containing latex particles with highly crosslinked particles; associative thickeners; flatting agents; pigment wetting and dispersing agents and surfactants; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID®; polypropylene, available from Hercules Inc., under the trademark HERCOFLAT®; synthetic silicate, available from J. M. Huber Corporation under the trademark ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners includes the methane/ethylene oxide associative thickeners and water soluble carboxylated thickeners, for example, those sold under the UCAR POLYPHOBE trademark by Union Carbide.

Several proprietary antifoaming agents are commercially available, for example, under the trademark BRUBREAK of Buckman Laboratories Inc., under the BYK® trademark of BYK Chemie, U.S.A., under the FOAMASTER® and NOPCO® trademark of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademark of Union Carbide Corporation.

Examples of fungicides, mildewcides, and biocides include 4,4-dimethyloxazolidine, 3,4,4-trimethyloxazolidine, modified barium metaborate, potassium N-hydroxymethyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Such paint or coating additives as described above form a relatively minor proportion of the coating composition, preferably about 0.05 weight % to about 5.00 weight %.

As a further aspect of the present invention, there is provided a coating composition as set forth above, further comprising one or more pigments and/or fillers in a concentration of about 1 to about 70 weight percent, preferably about 30 to about 60 weight percent, based on the total weight of the components of the composition.

Pigments suitable for use in the coating compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron Oxide); CI Pigment Yellow 42, CI Pigment Blue 15, 15:1, 15:2, 15:3, 15:4 (copper phthalocyanines); CI Pigment Red 49:1; and CI Pigment Red 57:1.

These modified polyolefins may also be used as adhesives for polyolefins and other types of plastic substrates. Thus, in a further aspect of the invention, there is provided a modified polyolefin adhesive composition comprising:
    a. the modified polyolefin composition of the present invention,
    b. an adhesive, and optionally
    c. a photoinitiator In such cases the modified polyolefin/adhesive/photoinitiator mixture may be applied to a substrate in which adherence or bonding of a coating, film, fabric, or other material is needed. The modified polyolefin/adhesive/photoinitiator mixture may be applied to the substrate by roller coating or other methods of application. The adhesive may then be cured before or after application of the coating, film, or fabric by an amount of ultraviolet radiation sufficient to affect the degree of curing. These types of adhesives may be especially effective when the coating, film, fabric, or other materials are pre-coated with resins that are capable of copolymerizing with the modified polyolefin adhesive compositions on the substrate upon exposure to ultraviolet radiation.

Other auxiliary polymerizable monomers and/or oligomers may also be used in conjunction with the modified polyolefin adhesive composition as described above. In this instance the modified polyolefin, containing auxiliary polymerizable monomers or oligomers and a photoinitiator, may be applied to the substrate to which adherence or bonding of a coating, film, fabric, or other material is needed. This mixture may be applied to the substrate by roller coating or other methods of application. The adhesive composition may then be cured before or after application of the coating, film, or fabric by an amount of ultraviolet radiation sufficient to effect the desired degree of curing. These adhesive compositions may also be especially effective when the coating, film, fabric, or other materials are pre-coated with resins that are capable of copolymerizing with the adhesive composition on the substrate upon exposure to ultraviolet radiation.

The invention disclosed herein can be further described by the following examples. It will be understood that these examples are included merely for purposes of illustration and are not intended to limit the scope of the invention unless otherwise specifically indicated.

EXAMPLES

The following test methods are referred to in the examples that follow the test methods:

Gasoline Resistance (Abbreviated Description of GM 9501P Method B)

Painted test samples are scribed with a sharp knife to make 100 squares. The scribed test samples are immersed in a 55/45 weight percent blend of Varnish Makers and Painters naphtha and toluene covered with aluminum foil. After 15 minutes immersion, the test samples are evaluated for number of squares removed or blistered. This is repeated every 15 minutes until the test samples have been immersed for 60 minutes, or all squares are removed. The percent paint removed and the percent paint retained is reported at each evaluation period, and the blistering.

Cross-Cut Tape Test (Abbreviated Description of ASTM 3359 Method B)

Painted test samples are scribed with a sharp knife to make 25 squares. The center of a piece of tape is placed over the scribed area and the tape is rubbed firmly into place with a pencil eraser or other object. The tape is removed by seizing the free end and by rapidly peeling it back on itself as close to a 90-degree angle as possible. The percent paint retained is reported.

Humidity Resistance (Abbreviated Description of ASTM D 4585)

Test specimens are mounted, with the painted side facing the inside of the Cleveland Humidity cabinet. All cracks are closed between specimens to prevent vapor loss and temperature variation. The thermostat is adjusted to set the vapor temperature at 120° C. The test specimens are removed periodically, and tested for cross-hatch adhesion and blister formation.

Determination of the Thermal Properties of Material with a TA Instruments Model 2920 Dual Sample Auto Differential Scanning Calorimeter with a Liquid Nitrogen Cooling Accessory This differential scanning calorimetry (DSC) method allows for the measurement of the amount of energy absorbed (endothermic) or emitted (exothermic) by a sample as a function of temperature. A maximum of three separately sealed aluminum pans, two containing materials of interest and one sealed empty aluminum pan as reference, are heated and cooled at a constant rate. The pans sit on raised platforms of the thermoelectric disc (constantan) which transfers heat to the sample(s) and reference positions. As heat is transferred through the disc, the differential heat flow to the sample(s) and reference is monitored by thermocouples attached to the bases of the samples and reference platforms. Data are analyzed using Universal V2.4F software of TA Instruments. The heat of fusion ($\Delta H_f$) of the sample is measured under the melting peak temperature ($T_m$) from the first heating scan, which is performed at a temperature range of −75 to 200° C.

Example 1

To a 500-ml, 3-neck round bottom flask equipped with a mechanical overhead stirrer, thermocouple, nitrogen purge, and a condenser was charged 250.0 grams of maleic anhydride modified polymer (25% in xylene) prepared as described in Comparative Example 1 (below) and 1.2 grams of hydroxyethyl acrylate (0.010 moles). The mixture was heated to 90° C. and held there with stirring for 2 hours. The reaction mixture was cooled to 80° C. and was then poured into a glass container. This reaction mixture was reduced to 5% in toluene for spray application. To this solution was added 4.0 weight percent, based on the modified polyolefin, of Irgacure 184 photoinitiator.

This composition was spray applied as a primer onto thermoplastic olefin (TPO) test plaques and air-dried for 10 minutes. After application of the primer and subsequent drying, the primer was then cured by exposure to ultraviolet radiation from a 300 watt per inch medium pressure mercury vapor lamp housed in an American Ultraviolet Company instrument (American Ultraviolet Model #LC061T3100) (Lamp—American UV Model UVC055). The coating was cured using three passes at a belt speed of 15 ft/min.

The panels were then top coated with an OEM polyester melamine-cured basecoat (DURETHANE 802) and polyester melamine-cured clearcoat (UCC 1001) supplied by PPG Industries and an OEM two-part polyurethane basecoat (206LE19689K) and two-part polyurethane clearcoat (317LE19929) supplied by Red Spot Paint & Varnish. Test results are listed in Table 1.

This is an example of a modified, UV-curable polyolefin adhesion promoter that provides excellent adhesion of 2-part urethane and melamine-cured coatings onto thermoplastic olefin (TPO) surfaces and provides excellent gasoline, and high temperature and humidity resistance.

TABLE 1

Crosshatch Adhesion Tape Test and Gasoline Resistance

| Example # | Top coat System | Initial Adhesion (ASTM 3359) | Adhesion After Humidity (When failure occurred) (ASTM D4585) | Gasoline Resistance (% adhesion and blistering) (GM 9501P) |
|---|---|---|---|---|
| Comparative Example 1 | 2-part urethane | 100% | 100% (504 Hrs.) | 100% (50% blistering) |
| Comparative Example 1 | 1-part melamine | 100% | 0 (24 Hrs.) | 100% (No blistering) |
| Comparative Example 2 | 2-part urethane | 0% | NA | 0% (after 10 min.) |
| Comparative Example 2 | 1-part melamine | 0% | NA | 0% (after 30 min.) |
| Example 1 | 2-part urethane | 100% | 100% (504 Hrs.) | 100% (No blistering) |
| Example 1 | 1-part melamine | 100% | 100% (504 Hrs.) | 100% (No blistering) |

Example 2

A 5% solution in xylene of the polymer prepared as described in Example 1, which contained 4.0 weight percent, based on the modified polyolefin, of Irgacure 184 photoinitiator, was spray applied onto polypropylene plaques and was air dried for approximately 10 minutes. The panels were then top coated with a radiation-curable cellulose ester lacquer (CAP-UV100; Supplied by Eastman Chemical Company). The lacquer formula is shown below:

UV-Cure Lacquer Formula

| Ingredient | Parts by Wt. |
|---|---|
| CAP-UV100[a] | 16.4 |
| Methyl amyl ketone | 32.6 |
| Methyl propyl ketone | 15.5 |
| Ethyl alcohol (Tecsol C (95%)) | 28.2 |
| Ebecryl 6700[b] | 3.6 |
| Ebecryl 220[b] | 2.7 |
| Byk 301[c] | 1.0 |
| Irgacure 184 photoinitiator[d] | 1.0 |

[a]radiation curable cellulose ester supplied by Eastman Chemical Company
[b]acrylated urethane resin supplied by UCB Radcure
[c]solution of polyether modified methylpolysiloxane copolymer in butyl glycol supplied by Byk-Chemie
[d]1-hydroxy-cyclohexyl-phenyl ketone supplied by Ciba Specialty Chemicals The coated panels were then cured by exposure to ultraviolet radiation from a 300 watt per inch medium pressure mercury vapor lamp housed in an American Ultraviolet Company instrument (American Ultraviolet Model #LC061T3100) (Lamp—American UV Model UVC055). The coating was cured using three passes at a belt speed of 15 ft/min. The panels were cooled to room temperature and were tested for initial adhesion (ASTM 3359 Method B). The percent retained initial adhesion was 100%. The panels were then submersed into a heated water bath (40° C.) and the percent-retained adhesion of the coating was checked after 120 hours. The percent retained adhesion=99%. The percent-retained adhesion of the coating was also checked after 240 hours of water immersion. The percent retained adhesion=98%.

This is an example of a modified, UV-curable polyolefin adhesion promoter that provides excellent adhesion of a UV-curable lacquer coating onto polypropylene surfaces and provides excellent water resistance.

Example 3

A 5% solution in xylene of the polymer prepared as described in Example 1, which contained 4.0 weight percent, based on the modified polyolefin, of Irgacure 184 photoinitiator, was spray applied onto polycarbonate plaques and was air-dried for approximately 10 minutes. The panels were then top coated with a radiation-curable cellulose ester coating described in Example 2. The coated panels were then cured by exposure to ultraviolet radiation from a 300 watt per inch medium pressure mercury vapor lamp housed in an American Ultraviolet Company instrument (American Ultraviolet Model #LC061T3100) (Lamp—American UV Model UVC055). The coating was cured using three passes at a belt speed of 15 ft/min. The panels were cooled to room temperature and were tested for initial adhesion (ASTM 3359 Method B). The percent retained initial adhesion=100%. The panels were then submersed into a heated water bath (40° C.) and the percent-retained adhesion of the coating was checked after 120 hours. The percent retained adhesion=100%. The percent-retained adhesion of the coating was also checked after 240 hours of water immersion. The percent retained adhesion=100%.

This is an example of a modified, UV-curable polyolefin adhesion promoter that provides excellent adhesion of a UV-curable lacquer coating onto polycarbonate surfaces and provides excellent water resistance.

Comparative Example 1

To a 1-L, 3-neck round bottom flask equipped with a mechanical overhead stirrer, condenser, addition funnel, and a nitrogen inlet was charged 275 grams tert-butyl benzene and 150.0 grams of a propylene-ethylene copolymer comprised of about 80 mole percent propylene and about 20 mole percent ethylene and having a heat of fusion of approximately 5.2 calories/gram. The copolymer had a Ring and Ball Softening Point of 135° C. The mixture was heated to 150 degrees C. over 45 minutes to provide a colorless solution. Maleic anhydride (12.0 grams) and 2,5-bis(tert-butylperoxy)-2,5-dimethylhexane (4.8 grams, radical initiator) were dissolved in 15.0 grams of acetone. The resulting solution of maleic anhydride/acetone/radical initiator was transferred to the addition funnel and charged to the reaction flask over 40 minutes. The contents of the flask were stirred for an additional 4 hours at 150 degrees C. following the addition of the maleic anhydride and the radical initiator. The tert-butylbenzene was distilled from the reaction mixture under vacuum until nothing else distilled from the pot at a temperature of 150 degrees C. and a pressure of 50 mm Hg. Xylene (478 grams, mixed isomers) was charged to the molten modified polyolefin over 20 minutes while maintaining the temperature between 116-145 degrees C. The resulting solution of the modified polyolefin in xylene was cooled to room temperature and bottled. Analysis of this material yielded an acid number of 11.6 mg KOH/gram with a solids level of 25.0%. Correcting for %-solids, the acid number value increases to 46.4 mg KOH/gram for 100 percent solid material. The Ring and Ball Softening Point was 115° C.

This composition was spray applied as a primer onto thermoplastic olefin (TPO) test plaques and air-dried for 10 minutes. After application of the primer, the panels were top coated with an original equipment manufacture (OEM) polyester melamine-cured basecoat (DURETHANE 802) and polyester melamine-cured clearcoat (UCC 1001) supplied by PPG Industries.

Paint adhesion tests were conducted in accordance with ASTM D3359B method. The results of this test were as follows: percent retained adhesion on Montell Hifax CA 187 AC TPO (TPO produced by Montell Polyolefins and supplied from Standard Plaque Inc.): 100%.

Cleveland humidity testing was conducted in accordance with ASTM D 4585 at 49° C. The results were as follows: percent retained adhesion after 24 hours exposure: 0%.

Gasoline Resistance was tested using General Motors test GM 9501P Method B. Results were as follows: Percent loss after 1 hour in synthetic fuel mixture (55/45 VM&P naphtha/toluene): 0% with no blistering observed.

This composition was spray applied as a primer onto thermoplastic olefin (TPO) test plaques and air-dried for 10 minutes. After application of the primer, the panels were top coated with an OEM two-part polyurethane basecoat (206LE19689K) and 2-part polyurethane clearcoat (317LE19929) supplied by Red Spot Paint & Varnish.

Paint adhesion tests were conducted in accordance with ASTM D3359B method. The results of this test were as follows: percent retained adhesion on Montell Hifax CA 187 AC TPO: 100%.

Cleveland humidity testing was conducted in accordance with ASTM D 4585 at 49° C. The results were as follows: percent retained adhesion after 48 hours exposure: 100%; percent retained adhesion after 192 hours exposure: 100%; percent retained adhesion after 504 hours exposure: 100%.

Gasoline Resistance was tested using General Motors test GM 9501P Method B. Results were as follows: Percent loss after 1 hour in synthetic fuel mixture (55/45 VM&P naphtha/toluene): 0%, but with 50% blistering observed.

This is an example of a graft-modified polyolefin that has not been further modified with a functional, ethylenically unsaturated compound. This example shows that when using this material as an adhesion promoter for thermoplastic olefin (TPO) poor high temperature and humidity resistance occurs with the melamine-cured coating.

Comparative Example 2

An unmodified propylene-ethylene copolymer comprised of approximately 80 mole percent propylene and 20-mole percent ethylene and having a heat of fusion of approximately 5.2 calories/gram was dissolved in xylene at 5% solids. The solution was filtered to remove undissolved polymer. This composition was spray applied as a primer onto thermoplastic olefin (TPO) test plaques and air-dried for 10 minutes. After application of the primer, the panels were top coated with an OEM polyester melamine-cured basecoat (DURETHANE 802) and polyester melamine-cured clearcoat (UCC 1001) supplied by PPG Industries. Test results are listed in Table 1.

The primed panels were top coated with an OEM two-part polyurethane basecoat (206LE19689K) and two-part polyurethane clearcoat (317LE19929) supplied by Red Spot Paint & Varnish. Test results are listed in Table 1.

This is an example of an unmodified propylene-ethylene copolymer that does not perform well as an adhesion promoter for thermoplastic olefin (TPO) surfaces, regardless of the coating.

Comparative Example 3

A 5% solution in xylene of the polymer prepared as described in Comparative Example 1 was spray applied onto polycarbonate plaques and was air-dried for approximately 10 minutes. The panels were then top coated with a radiation-curable cellulose ester coating described in Example 2. The coated panels were then cured by exposure to ultraviolet radiation from a 300 watt per inch medium pressure mercury vapor lamp housed in an American Ultraviolet Company instrument (American Ultraviolet Model #LC061T3100) (Lamp—American UV Model UVC055). The coating was cured using three passes at a belt speed of 15 ft/min. The panels were cooled to room temperature and were tested for initial adhesion (ASTM 3359 Method B). The percent retained adhesion=0% (complete delamination).

This is an example of a graft-modified polyolefin that has not been further modified with a functional, ethylenically unsaturated compound. When using this material as an adhesion promoter for a radiation curable cellulose ester coating on polycarbonate, severe delamination of the coating occurs during initial adhesion testing.

Comparative Example 4

A 5% solution of a chlorinated polyolefin, CP 343-3 supplied by Eastman Chemical Company, was spray applied onto polypropylene plaques and was air-dried for approximately 10 minutes. The panels were then top coated with a radiation-curable cellulose ester coating described in Example 2. The coated panels were then cured by exposure to ultraviolet radiation from a 300 watt per inch medium pressure mercury vapor lamp housed in an American Ultraviolet Company instrument (American Ultraviolet Model #LC061T3100) (Lamp—American UV Model UVC055). The coating was cured using three passes at a belt speed of 15 ft/min. The panels were cooled to room temperature and were tested for initial adhesion (ASTM 3359 Method B). The percent retained initial adhesion=53% (moderate-severe delamination). The panels were not checked for water resistance due to the extensive failure in initial adhesion testing.

This is an example of a chlorinated, graft-modified polyolefin, similar to materials described in U.S. Pat. No. 4,303,697, which has not been modified with a functional, ethylenically unsaturated compound. When using this material as an adhesion promoter for a radiation curable cellulose ester coating on polypropylene, severe delamination of the coating occurs during the initial adhesion testing.

Comparative Example 5

A 5% solution in xylene of the polymer prepared as described in Comparative Example 1 was spray applied onto polypropylene plaques and was air-dried for approximately 10 minutes. The panels were then top coated with a radiation-curable cellulose ester coating described in Example 2. The coated panels were then cured by exposure to ultraviolet radiation from a 300 watt per inch medium pressure mercury vapor lamp housed in an American Ultraviolet Company instrument (American Ultraviolet Model #LC061T3100) (Lamp—American UV Model UVC055). The coating was cured using three passes at a belt speed of 15 f/min. The panels were cooled to room temperature and were tested for initial adhesion (ASTM 3359 Method B). The percent retained initial adhesion=99%. The panels were then submersed into a heated water bath (40° C.) and the percent-retained adhesion of the coating was checked after 120 hours. The percent retained adhesion=0% (complete delamination). This is an example of a graft-modified polyolefin that has not been further reacted with a functional, ethylenically unsaturated compound. This material provides good initial adhesion of the UV-curable lacquer onto polypropylene, but shows extensive adhesion failure after submersion into a heated water bath.

What is claimed is:

1. A modified polyolefin composition having pendant unsaturated groups and at least one other pendant functional group comprising the reaction product of a functionalized polyolefin and one or more ethylenically unsaturated compounds having a functional group reactive with the functional group on the polyolefin, wherein the functionalized polyolefin is prepared from a polyolefin having a heat of fusion of 0 to 10 calories/gram.

2. The modified polyolefin composition of claim 1 wherein the functionalized polyolefin is obtained by reacting a polyolefin polymer selected from the group consisting of ethylene copolymers prepared from ethylene and alpha olefins having 3 to about 10 carbon atoms; polypropylene; propylene copolymers prepared from ethylene or alpha olefins having from 4 to about 10 carbon atoms; poly(1-butene); and 1-butene copolymers prepared from 1-butene and ethylene or alpha olefins having 3 to about 10 carbon atoms, with monomers selected from the group consisting of unsaturated carboxylic acid esters, unsaturated carboxylic acids, unsaturated carboxylic anhydrides, vinyl monomers, acrylic monomers or mixtures thereof.

3. The modified polyolefin composition of claim 2 wherein the polyolefin polymer is an ethylene-propylene copolymer comprised of about 80 mole percent propylene and about 20 mole percent ethylene.

4. The modified polyolefin composition of claim 2 wherein the unsaturated carboxylic acid esters, unsaturated carboxylic acids, unsaturated carboxylic anhydrides, vinyl monomers, and acrylic monomers are selected from the group consisting of maleic anhydride, citraconic anhydride, itaconic anhydride, glutaconic anhydride, 2,3-dimethylmaleic anhydride, maleic acid, fumaric acid, citraconic acid, 2-pentenoic acid, 2-methyl-2-pentenoic acid, dimethyl maleate, di-n-propyl maleate, diisopropyl fumarate, dimethyl itaconate, methyl acrylate, methacrylic acid, hydroxyethyl acrylate, ethyl acrylate, methyl acrylate, ethyl methacrylate, methyl crotanate, ethyl crotanate, hydroxyethyl methacrylate, hydroxy-propyl acrylate, hydroxypropyl methacrylate, and mixtures thereof.

5. The modified polyolefin composition of claim 1 wherein the ethylenically unsaturated compound is selected from the group consisting of hydroxyethyl acrylate, hydroxyethyl methacrylate, hydroxypropyl acrylate, hydroxypropyl methacrylate, polyethylene-glycol monoacrylate, polyethyleneglycol monomethacrylate, polyalkyleneglycol monomethacrylate, polypropyleneglycol monoacrylate, polypropyleneglycol mono-methacrylate, maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate and mixtures thereof.

6. A solvent based primer composition comprising the modified polyolefin of claim 1, a solvent, and optionally, a photoinitiator.

7. The solvent-based primer composition of claim 6 wherein the solvent is selected from the group consisting of ester solvents, ketone solvents, aliphatic solvents, aromatic solvents and mixtures thereof.

8. The solvent-based primer composition of claim 6 wherein said photoinitiator is selected from the group consisting of acetophenone and benzophenone/tertiary amine combinations; organic peroxides; benzoin and its ethers; and benzil and benzil ketals.

9. The solvent-based primer composition of claim 6 wherein said photoinitiator is added in the range of 0.01 to 8.0 weight percent based on the non-volatile, ethylenically unsaturated content of the coating composition.

10. The solvent-based primer composition of claim 6 further comprising auxiliary polymerizable monomers and/or oligomers.

11. The solvent-based primer composition of claim 10 wherein said auxiliary polymerizable monomers and/or oligomers is selected from the group consisting of vinyl acetate, N-vinyl pyrrolidone methyl(meth)acrylate, butyl (meth)acrylate, 2-hydroxyethyl(meth)acrylate, neopentylglycol di(meth)acrylate, triethyleneglycol di(meth)acrylate, trimethylolpropane triacrylate, (meth)acrylated urethanes, (meth)acrylated epoxies, and (meth)acrylated polyesters and polyethers.

12. A water-based primer composition comprising:
  a. the modified polyolefin composition of claim 1;
  b. from 18 to 50 weight percent, based on the weight of component (a), of a surfactant;
  c. from 2 to 30 weight percent, based on the weight of component (a), of an amine;
  d. water; and optionally,
  e. a photoinitiator.

13. The water-based primer composition of claim 12 wherein said surfactant is selected from the group consisting of primary ethoxylated alcohols having 12 to 15 carbon atoms and secondary ethoxylated alcohols having 11 to 15 carbon atoms.

14. The water-based primer composition of claim 12 wherein said amine is a primary, secondary or tertiary amine selected from the group consisting of morpholine, 2-amino-2-methyl-1-propanol, triethylamine, tributylamine, ammonium hydroxide, 2-dimethylaminoethanol, triethanolamine, and 2-propylaminoethanol.

15. The water-based primer composition of claim 12 wherein said photoinitiator is selected from the group consisting of acetophenone and benzophenone/tertiary amine combinations; organic peroxides; benzoin and its ethers; and benzil and benzil ketals.

16. The water-based primer composition of claim 12 further comprising auxiliary polymerizable monomers and/or oligmers.

17. The water-based primer composition of claim 16 wherein said auxiliary polymerizable monomers and/or oligomers is selected from the group consisting of vinyl acetate, N-vinyl pyrrolidone methyl(meth)acrylate, butyl (meth)acrylate, 2-hydroxyethyl(meth)acrylate, neopentyl glycol di(meth)acrylate, triethyleneglycol di(meth)acrylate, trimethylolpropane triacrylate, (meth)acrylated urethanes, (meth)acrylated epoxies, and (meth)acrylated polyesters and polyethers.

18. A modified polyolefin adhesive composition comprising:
   a. the modified polyolefin composition of claim 1,
   b. and optionally a photoinitiator.

19. The modified polyolefin adhesive composition of claim 18 wherein said photoinitator is selected from the group consisting of acetophenone and benzophenone/tertiary amine combinations; organic peroxides; benzoin and its ethers; and benzil and benzil ketals.

20. The modified polyolefin adhesive composition of claim 18 further comprising auxiliary polymerizable monomers and/or oligomers.

21. The modified polyolefin adhesive composition of claim 20 wherein said auxiliary polymerizable monomers and/or oligomers is selected from the group consisting of vinyl acetate, N-vinyl pyrrolidone methyl(meth)acrylate, butyl(meth)acrylate, 2-hydroxyethyl(meth)acrylate, neopentyl glycol di(meth)acrylate, triethyleneglycol di(meth)acrylate, trimethylolpropane triacrylate, (meth)acrylated urethanes, (meth)acrylated epoxies, and (meth)acrylated polyesters and polyethers.

22. A process for preparing a coated substrate comprising:
   a. applying the modified polyolefin composition of claim 1 to a substrate;
   b. exposing the modified polyolefin composition on the substrate to an amount of ultraviolet radiation sufficient to effect a degree of curing of said modified polyolefin on said substrate; and
   c. applying a paint topcoat to said substrate.

23. An article of manufacture comprising a substrate and the modified polyolefin of claim 1.

24. A modified polyolefin composition having pendant unsaturated groups and at least one other pendant functional group comprising the reaction product of a functionalized polyolefin and one or more ethylenically unsaturated compounds having a functional group reactive with the functional group on the polyolefin.

25. The modified polyolefin composition of claim 24 wherein the functionalized polyolefin is obtained by reacting a polyolefin polymer selected from the group consisting of ethylene copolymers prepared from ethylene and alpha olefins having 3 to about 10 carbon atoms; polypropylene; propylene copolymers prepared from ethylene or alpha olefins having from 4 to about 10 carbon atoms; poly(1-butene); and 1-butene copolymers prepared from 1-butene and ethylene or alpha olefins having 3 to about 10 carbon atoms, with monomers selected from the group consisting of unsaturated carboxylic acid esters, unsaturated carboxylic acids, unsaturated carboxylic anhydrides, vinyl monomers, acrylic monomers or mixtures thereof.

26. The modified polyolefin composition of claim 25 wherein the polyolefin is an ethylene-propylene copolymer comprised of about 80 mole percent propylene and about 20 mole percent ethylene.

27. The modified polyolefin composition of claim 25 wherein the unsaturated carboxylic esters, unsaturated carboxylic acids, unsaturated carboxylic anhydrides, vinyl monomers, and acrylic monomers are selected from the group consisting of maleic anhydride, citraconic anhydride, itaconic anhydride, glutaconic anhydride, 2,3-dimethylmaleic anhydride, maleic acid, fumaric acid, citraconic acid, 2-pentenoic acid, 2-methyl-2-pentenoic acid, dimethyl maleate, di-n-propyl maleate, diisopropyl fumarate, dimethyl itaconate, methyl acrylate, methacrylic acid, hydroxyethyl acrylate, ethyl acrylate, methyl acrylate, ethyl methacrylate, methyl crotanate, ethyl crotanate, hydroxyethyl methacrylate, hydroxy-propyl acrylate, hydroxypropyl methacrylate, and mixtures thereof.

28. The modified polyolefin composition of claim 24 wherein the ethylenically unsaturated compound is selected from the group consisting of hydroxyethyl acrylate, hydroxyethyl methacrylate, hydroxypropyl acrylate, hydroxypropyl methacrylate, polyethylene-glycol monoacrylate, polyethyleneglycol monomethacrylate, polyalkyleneglycol monomethacrylate, polypropyleneglycol monoacrylate, polypropyleneglycol mono-methacrylate, maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate and mixtures thereof.

29. A solvent based primer composition comprising the modified polyolefin of claim 24, a solvent, and optionally, a photoinitiator.

30. The solvent-based primer composition of claim 29 wherein the solvent is selected from the group consisting of ester solvents, ketone solvents, aliphatic solvents, aromatic solvents and mixtures thereof.

31. The solvent-based primer composition of claim 29 wherein said photoinitiator is present and is selected from the group consisting of acetophenone and benzophenone/tertiary amine combinations; organic peroxides; benzoin and its ethers; and benzil and benzil ketals.

32. The solvent-based primer composition of claim 29 wherein said photoinitiator is added in the range of 0.01 to 8.0 weight percent based on the non-volatile, ethylenically unsaturated content of the coating composition.

33. The solvent-based primer composition of claim 29 further comprising auxiliary polymerizable monomers and/or oligomers.

34. The solvent-based primer composition of claim 33 wherein said auxiliary polymerizable monomers and/or oligomers is selected from the group consisting of vinyl acetate, N-vinyl pyrrolidone methyl(meth)acrylate, butyl(meth)acrylate, 2-hydroxyethyl (meth)acrylate, neopentylglycol di(meth)acrylate, triethyleneglycol di(meth)acrylate, trimethylolpropane triacrylate, (meth)acrylated urethanes, (meth)acrylated epoxies, and (meth)acrylated polyesters and polyethers.

35. A modified polyolefin adhesive composition comprising:
   a. the modified polyolefin composition of claim 24,
   b. and optionally a photoinitiator.

36. The modified polyolefin adhesive composition of claim 35 wherein said photoinitator is present and is selected from the group consisting of acetophenone and benzophenone/tertiary amine combinations; organic peroxides; benzoin and its ethers; and benzil and benzil ketals.

37. The modified polyolefin adhesive composition of claim 35 further comprising auxiliary polymerizable monomers and/or oligomers.

38. The modified polyolefin adhesive composition of claim 37 wherein said auxiliary polymerizable monomers and/or oligomers is selected from the group consisting of vinyl acetate, N-vinyl pyrrolidone methyl(meth)acrylate, butyl(meth)acrylate, 2-hydroxyethyl(meth)acrylate, neopentyl glycol di(meth)acrylate, triethyleneglycol di(meth)acrylate, trimethylolpropane triacrylate, (meth)acrylated urethanes, (meth)acrylated epoxies, and (meth)acrylated polyesters and polyethers.

39. A process for preparing a coated substrate comprising:
   a. applying a modified polyolefin composition of claim 24 to a substrate;
   b. exposing the modified polyolefin composition on the substrate to an amount of ultraviolet radiation sufficient to effect a desired degree of curing of said modified polyolefin on said substrate; and
   c. applying a paint topcoat to said substrate.

40. An article of manufacture comprising a substrate and the modified polyolefin of claim 1.

41. An article of manufacture comprising a substrate and the modified polyolefin of claim 24.

* * * * *